3,573,053
PHOTOGRAPHIC PROCESS FOR PRODUCING A PLURALITY OF IMAGES ON PREDETERMINED AREAS OF A CHEMICALLY DESENSITIZED SILVER HALIDE LAYER BY SEQUENTIAL THERMAL RESENSITIZATION, EXPOSURE, AND CHEMICAL RE-DESENSITIZATION OF EACH AREA
Edgar A. MacWilliam, Hilton, and Charles A. Goffe, Brockport, N.Y., assignors to Eastman Kodak Company, Rochester, N.Y.
No Drawing. Filed May 2, 1968, Ser. No. 726,231
Int. Cl. G03c 1/36, 5/04
U.S. Cl. 96—101                 15 Claims

ABSTRACT OF THE DISCLOSURE

A photographic process in which a generally desensitized photographic silver halide element is locally resensitized in one area by application of heat, exposed to produce a latent image in the resensitized area, desensitized in the resensitized and exposed area, locally resensitized in another area, and this sequence of steps repeated to produce latent images in other areas and finally photographically developing and fixing the exposed photographic element, is used to advantage to produce a plurality of photographic images in predetermined areas of the photographic element in such a way that latent images in the element are not affected by light exposure used to produce subsequent latent images.

---

This invention relates to a photographic silver halide element and to the use of such an element in a process for sequentially recording a series of light images on different areas of said element so that light exposure of one area has no effect on unexposed or latent image bearing silver halide in immediately adjacent areas and then photographically developing the latent images.

For various purposes it is desired to make a plurality of photographic images on a photographic element. In the graphic arts for example "paste-ups" comprising a composite of pictures, graphs, maps, etc., are made by pasting the various parts of the composite picture on a common support and then photographically copying this as the next step in making a printing plate. Photographic materials and processes are desired to eliminate the need for making the "paste-up." Another example is in character recognition systems using fiber optics to conduct a light image from an input plane to an output plane for which masks are needed for each character that is to be recognized. The various masks are advantageously made on a common support. The assemblies of optical fibers (for example, glass fibers) are in fiber "bundles" in which the fibers are either precisely aligned so that the relationship of each fiber is the same at the input and output planes so the output plane image is essentially the same as the input plane, or the fibers are aligned so that their arrangement in the input and output planes is not the same and the fiber bundle splits the image into pattern of light spots. For character recognition it is desired to produce for each character to be recognized at the input plane of an optical fiber bundle, a separate mask which when placed over the output plane of the optical fiber bundle will, either transmit an amount of light below a certain limiting vlue (when mask is a negative) or transmit an amount of light above a certain limiting value (when mask is a positive). It is advantageous to have the various masks on different areas to a piece of photographic film.

The production of such a mask suitable for use in fiber optic systems can be accomplished photographically by means of a photographic silver halide layer. However, it is necessary that the silver halide layer that is held at the output plane be capable of being sensitized only in one grid area to the light which is passed by a given character. After exposure, it is necessary that the exposed area be made insensitive. Thus, when the next character is placed in the input plane, the light passed by it will not affect the already exposed grid, but only another grid which has now been sensitized to light.

It is an object of the invention to provide a novel process of repeatedly resensitizing, exposing and desensitizing generally desensitized silver halide elements at various local areas of the element without significantly affecting the developability of the entire element.

Another object of the invention is to provide a novel process for the production of a photographic mask that is suitable for character recognition using a fiber optic system.

A still further object of the invention is to provide a novel glass fiber character recognition system.

A still further object of the invention is to provide a novel photographic mask carrying a plurality of photographic images thereon at predetermined areas.

These and other objects of the invention are accomplished by our method which comprises thermally resensitizing a portion of the surface of a desensitized silver halide layer to the recording of latent image, exposing the thermally resensitized portion of said layer, and desensitizing the exposed portion of the layer.

According to the present invention, a photographic element comprising a silver halide layer that has been desensitized to the recording of latent images, is subjected to an elevated temperature at a local area for a short period of time to thermally resensitize the said area which is then subjected to photographic exposure. The exposed area is then desensitized to the recording of any further latent image. Next, a different area of the silver halide layer is thermally resensitized, photographically exposed and desensitized. This procedure is advantageously repeated until the entire surface of the photographic element carries a plurality of various latent images. Finally, the entire element is processed so as to develop the latent images and the desired photographic reproduction is produced. Our process is used advantageously for producing a plurality of separate images on various areas of a photographic element so that each exposure affects only the desired area.

As previously mentioned, the initial step in the method of the present invention is the provision of a silver halide layer that is desensitized to the recording of latent images. The desensitization is preferably accomplished by means of a chemical agent. The desensitizer is incorporated into the silver halide layer or is coated onto the silver halide layer prior to thermal resensitization.

Typical desensitizers which are present in the photographic silver halide layers of the invention include heavy metal salts, such as mercury salts, rhodium salts, etc. Other desensitizers which are used comprise heterocyclic compounds containing at least one hetero sulfur and/or nitrogen atom. Heterocyclic desensitizers containing at least one benzene ring, and desirably containing at least one nitro substituent attached to the benzene ring, are especially useful. Typical of such organic desensitizers are benzotriazole compounds containing a nitro substituent on the benzene ring of the benzotriazole nucleus, e.g., 5 - nitrobenzo-1,2,3-triazole, 4 - nitrobenzo-1,2,3-triazole, etc. (including their halogen substituted derivatives, such as 5-chloro-, 6-chloro-, etc.)

Non-heterocyclic aromatic desensitizers containing at least one nitro substituent such as 3,5-dinitrobenzhydrazide and the like are also useful. Another group of desensitizers comprise a class of dyes known as styryl dyes which contain at least one nitro substituent attached to a benzene ring. Other desensitizers include anil and safranine dyes. Anthraquinone dyes containing a sulfoalkylaminosulfone radical are also used to desensitize photographic silver halide emulsions useful in practicing the invention.

The following compounds are representative of desensitizers which are useful in treating the photographic silver halide layers of the present invention:

Mercuric chloride,
Triammonium hexachlororhodite,
3,5-dinitrobenzhydrazide,
5-nitrobenzo-1,2,3-triazole,
4-nitro-6-chlorobenzotriazole,
2,3-dimethyl-6-nitrobenzothiazolium p-toluenesulfonate,
2-phenylbenzo-1,2,3-thiadiazolium bromide,
N,N'-decamethylene-bis(quinoxalinium)perchlorate,
Methylene blue chloride,
1-methyl-2(p-nitrostyryl)16-ethoxyquinolinium p-toluenesulfonate,
2-(p-diethylaminophenyliminomethyl)-1,6-dimethylquinolinium chloride,
2-(p-dimethylaminophenyliminomethyl)-3-ethylbenzothiazolium ethosulfate,
Pheno safranine (chloride),
Pinakryptol green (chloride),
1,3-diamino-5-methylphenazinium chloride,
3-methyl-2-bis(phenylazo)methylene benzothiazoline, and
Anthraquinone-2-sulphotauride.

Patents which describe photographic silver halide desensitizers useful in treating the silver halide layers of the invention include the following, for example:

Schuloff, U.S. 1,653,314, granted Dec. 20, 1927,
Homolka, U.S. 1,760,756, granted May 27, 1930,
Muller et al., U.S. 2,196,162, granted Apr. 2, 1940,
Kendall et al., U.S. 2,541,472, granted Feb. 13, 1951,
Kendall et al., U.S. 2,669,515, granted Feb. 16, 1954,
Horwitz, U.S. 2,794,802, granted June 4, 1957,
Stewart et al., U.S. 3,250,618, granted May 10, 1966,
Groves, British 465,343, accepted Apr. 30, 1937,
Compagnie, French 1,049,896, issued Aug. 26, 1953
   and addition 64,756, issued June 29, 1955, and
Compagnie, French 1,092,537, issued Nov. 10, 1954.

The 2-phenylbenzo-1,2,3-thiadiazolium bromide, supra, can be prepared according to the method described by A. Burowoy, A. Chaudhuri and C. E. Vellins in "Journal Chemical Society" (London), page 90 (1956). The 2-(p-diethylaminophenyliminomethyl) - 1,6 - dimethylquinolinium chloride is described by Mees, "The Theory of the Photographic Process," 1st ed. (Macmillan), page 1043 (page 422 of 2nd ed.), and by Kendall et al., British Pat. 447,109, accepted May 4, 1936. The desensitizer, 3-methyl-2-bis(phenylazo)methylene benzothiazoline may be prepared as described in French Pat. 1,049,896.

Especially useful desensitizers which are described in several of the aforementioned patents include the cycloammonium quaternary salts represented by the following general formula:

(A)
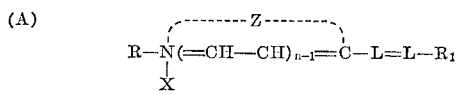

wherein R represents an alcohol radical, i.e., a substituted or unsubstituted alkyl group, such as methyl, ethyl, propyl, butyl, ethoxycarbonylmethyl, β-hydroxyethyl, etc., $R_1$ represents an aryl group, such as phenyl, or phenyl substituted by common organic radicals, such as hydroxyl, nitro, amino, alkylamino, dialkylamino, methyl, ethyl, ethoxyl, methoxyl, etc., L represents a methine group, i.e., a —CR'= group where R' represents a hydrogen atom or an alkyl group, such as methyl, ethyl, etc., X represents an acid radical, such as chloride, bromide, iodide, perchlorate, benzenesulfonate, p-toluenesulfonate, methylsulfate, ethylsulfate, etc., $n$ represents a positive integer of from 1 to 2, and Z represents the non-metallic atoms necessary to complete a heterocyclic nucleus containing nitrogen, oxygen, sulfur, selenium, etc., with at least one nitrogen atom and from 5 to 6 atoms in the heterocyclic ring, such nuclei being well known to those skilled in the art.

It is to be understood that the styryl dyes embraced by Formula A above contain at least one benzene nucleus to which is attached at least one nitro group. Typical nuclei defined by Z include benzothiazole, quinoline, benzoxazole, indolenine, etc., which can contain simple substituents on the benzene ring thereof, such as methyl, ethyl, methoxy, ethoxy, hydroxyl, amino, etc.

The desensitized silver halide layer is thermally resensitized over a predetermined portion of the surface of th layer. The resensitized area is then exposed without affecting the remaining surface area of the silver halide layer which has not been resensitized. By heating the surface of the silver halide layer to a temperature, for example, of between about 100° and about 300° C. for a short period of time, the sensitivity of the silver halide coating to the formation of latent images is restored.

The heat treatment is carried out over various periods of time. For example, time periods of up to about five minutes are suitable, while periods up to one minute are preferred. Higher temperatures require shorter treatment periods. The optimum temperature and time period can be easily determined experimentally by those skilled in the art. Any suitable heating means is employed in the local, thermal resensitization step of the present invention. For example, hot platens, heater bars, infrared lamps, and the like are employed. A suitable mode of thermal resensitization is disclosed in U.S. Pat. No. 3,250,618 to Stewart et al., the disclosure of which is hereby incorporated by reference.

The photographic element having a portion thereof thermally resensitized is now photographically exposed with the result that a latent image is formed on the resensitized portion. The remaining portion of the silver halide layer is insensitive to light due to the presence of the desensitizer and the fact that it has not been resensitized.

The exposed, thermally resensitized portion of the silver halide is now subjected to the action of a desensitizing agent, which is the same or different from that initially employed for the desensitization of the entire surface of the silver halide. Thus, any of the desensitizing agents previously described are employed for the desensitization of the exposed area. The desensitizing agent, is applied locally, i.e., only over the thermally resensitized portion of the silver halide surface, or is applied over the entire surface. However, it is preferred to apply the desensitizer locally, by means of a suitable applicator, e.g., a felt pad, preformed web, etc.

Any suitable amount of desensitizer is employed. The concentration used will depend upon the nature of the silver halide layer, the type of desensitizer and various other factors. However, the amount of desensitizer employed must be sufficient to result in a silver halide layer having a sensitivity low enough so that the exposure of the final local area that is resensitized will yield recognizable differences in density over the entire element. This concentration can be easily determined experimentally with the particular silver halide coating and desensitizing agent employed, and is well within the skill of the art.

The photographic element of the present invention is produced employing, for example, a light-sensitive developing-out silver halide as a silver halide emulsion layer, or an evaporated silver halide layer. Any silver halide, such as silver bromide, silver chloride, silver iodide, silver chlorobromide, silver bromoiodide, silver chlorobromoiodide, and the like is used. Suitable emulsions include those described by Trivelli and Smith, Phot. Journal, 79, 330 (1939), the disclosure of which is hereby incorporated by reference. The evaporated silver halide layer will be discussed later herein.

The emulsions are advantageously chemically sensitized by any of the accepted procedures. Other conventional silver halide emulsion addenda can also be utilized, such as coating aides, gelatin hardeners, gelatin plasticizers, etc. Where it is desired to produce a dye and silver image in our photographic process a nondiffusing color-forming coupler, such as is used in color photographic materials is advantageously incorporated in the photographic emulsion by any of the well known methods such as are described by Martinez U.S. Pat. 2,284,877, Jelley and Vittum U.S. Pat. 2,322,027, Fierke U.S. Pat. 2,801,107, Fierke et al. U.S. Pat. 2,801,171, etc., or by the Fischer incorporating technique. Usually, a phenolic or a naphtholic coupler is used to produce a cyan dye image, a 5-pyrazolone coupler is used to form a magenta dye and an open chain ketomethylene type coupler is used to form a yellow dye. Thousands of these couplers are described in the color photographic art, including representative examples in references such as mentioned above.

In the preparation of the silver halide dispersions employed for preparng silver halide emulsions, there is employed as the dispersing agent for the silver halide in its preparation, gelatin or some other colloidal derivative, or a synthetic resin, for instance, a polyvinyl compound. Some colloids which are used are polyvinyl alcohol or a hydrolyzed polyvinyl acetate as described in Lowe U.S. Pat. 2,286,215, issued June 16, 1942; a far hydrolyzed cellulose ester such as cellulose acetate hydrolyzed to an acetyl content of 19–26% as described in U.S. Pat. 2,327,-808 of Lowe and Clark, issued Aug. 24, 1943; a water-soluble ethanolamine cellulose acetate as described in Yutzy U.S. Pat. 2,322,085, issued June 15, 1943; a polyacrylamide or an imidized polyacrylamide was described in Lowe, Minsk and Kenyon U.S. Pat. 2,541,474, issued Feb. 13, 1951; zein as described in Lowe U.S. Pat. 2,563,-791, issued Aug. 7, 1951; a vinyl alcohol polymer containing urethane carboxylic acid groups of the type described in Unruh and Smith U.S. Pat. 2,768,154, issued Oct. 23, 1956; or containing cyano-acetyl groups such as the vinyl alcohol-vinyl cyanoacetate copolymer as described in Unruh, Smith and Priest U.S. Pat. 2,808,331, issued Oct. 1, 1957; or a polymeric material which results from polymerizing a protein or a saturated acrylated protein with a monomer having a vinyl group as described in U.S. Pat. 2,852,382 of Illingsworth, Dann and Gates, issued Sept. 16, 1958.

Evaporated silver halide layers are also advantageously employed for the production of the photographic elements of the present invention. Such layers are formed without the usual colloidal vehicle, for example, by vapor deposition in high vacuum of one or a mixture of silver halides onto a support, such as paper, plastic, film or glass, and the like. Highly suitable evaporated silver halide layers for employment in the method of the present invention may be prepared, for example, according to the methods described in U.S. Pat. 3,316,096 and U.S. Pat. 3,335,009 to Rasch and Hodges, which are hereby incorporated by reference. Thus, the photoelement of the present invention advantageously comprises separate contiguous layers of vacuum deposited light-sensitive silver halide and vacuum deposited alkali metal halide salt, such as potassium bromide and sodium chloride. Likewise, the photoelement advantageously comprises an evaporated silver halide layer overcoated with a hydrophic colloid coating containing a compound having the formula:

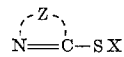

where Z represents the non-metallic atoms necessary to complete a heterocyclic nucleus containing from 5 to 6 atoms in a heterocyclic ring and SX is a mercapto function. The mercapto function or group can be in the free (—SH) form or in the salt (—SX) form. X is a cation, for example, hydrogen, an alkali metal such as sodium or potassium, ammonium or an organic amine residue of such amines as triethyl amine, triethanol amine, morpholine and the like. Suitable examples of such mercapto heterocyclic nitrogen compounds are described in U.S. Pat. 3,335,009.

The locally resensitized area of our photographic element is advantageously exposed to a light image by any of the methods used in photography, i.e., contact printing in which a transparency bearing the desired image is held in contact with the resenitized area of our element while light is passed through the transparency to our element, projection printing in which a transparency is projected onto the resensitized area of our element, exposure in a camera, etc. In addition to these conventional methods, a particularly advantageous method of exposure is by positioning the resensitized area of our photographic element over the output plane of a bundle of optical fibers used to conduct a light image from the input plane of the bundle of optical fibers. Any suitable light source is advantageously used for making the exposure. The selection of the optimum light source and exposure will depend upon the particular element used, the effects desired, etc., and can be easily determined by methods well known in the art.

Any of the conventional photographic developer solutions used for developing-out silver halide layers are used to advantage in our process. Any of the conventional developing agents, e.g., a polyhydroxybenzene compound (e.g., hydroquinone, hydroquinone derivatives, catechol, pyrogallol, etc.), a 3-pyrazolidone (e.g., 1-phenyl-3-pyrazolidone, 1-tolyl-3-pyrazolidone, 4-methyl-1-phenyl - 3 - pyrazolidone, 4,4-dimethyl-1-phenyl-3-pyrazolidone, etc.), an aminophenol (e.g., N - methyl - p-aminophenol, p-β-hydroxyethylaminophenol, p-α-aminoethylaminophenol, 2,4-diaminophenol, etc.), a p-phenylenediamine (e.g., p-phenylenediamine, diethyl-p-phenylenediamine, methyl-p-phenylenediamine, 2-amino-5-diethylaminotoluene, 4-[N-ethyl - N - (β-hydroxyethyl) amino]aniline, etc. etc., are used to advantage. With the exceptioin of 2,4-diaminophenol which develops exposed silver halide even in acid solution, the developing agents singly or in combination are used in alkaline solution. Any of the addenda used in developer solutions including alkali metal sulfite, alkali metal bromide, alkali metal thiocyanate, etc., are used to advantage in our solutions. The above developer solutions produce a silver image in exposed silver halide. In instances where it is desired to form a dye image, a primary aromatic amine color developing agent such as is illustrated by the p-phenylenediamine developers above is used in the developer solution along with a diffusible color-forming coupler such as is used in color photographic developer solutions (providing a nondiffusing coupler is not incorporated in the emulsion layer). For example, a phenolic naptholic coupler is used to produce a cyan dye image, a 5-pyrazolone coupler is used to produce a magenta dye image and an open chain ketomethylene coupler such as an acetoacetanilide coupler is used to provide a yellow dye image.

The following examples are included for a further understaning of our invention.

EXAMPLE 1

A fine grained gelatino silver chlorobromide emulsion consisting of 40 mole percent chloride and containing one gram of the densensitizer, 4-nitro-6-chlorobenzotriazole, per mole of silver halide is coated on a cellulose acetate film support at a coverage of 137 milligrams of silver per square foot and 510 milligrams of gelatin per square foot. This compound desensitizes the emulsion to at least 1.0 log E. A brass heating unit comprising a brass block two inches long and having a one square inch heating surface, which is attached to an insulated handle and connected to a powerstat, is applied to the film with moderate pressure for a period of 15 seconds. The dial of the powerstat is adjusted to result in a temperature of 142° C. at the heating surface. This resensitizes the emulsion over a one square inch area. Next, the film is exposed from the top edge with the exposure running the full width of the film strip. Also, a strip of similar film which has not been desensitized or thermally resensitized is exposed in the same manner for control purposes. A portion (A) of the resensitized and exposed area is bathed with a solution of the desensitizer, pinacryptol green, using a felt pad supported by a wooden block, while the remaining portion (A′) of the resensitized and exposed area is left untreated. The pinacryptol green solution has the following composition:

TABLE 1

| Ingredient: | Amount |
|---|---|
| Pinacryptol green | g 0.1 |
| Denatured ethanol | ml 27.5 |
| Saponin | ml 5.5 |
| Distilled water to make | ml 500 |

A second area (B) of the emulsion which had received the first exposure is thermally resensitized by the brass heating unit in the same manner as areas A and A′. A second stepped exposure is applied over the emulsion, superimposing the previous exposure. The area B is then desensitized with the pinacryptol green solution of Table 1. The entire film strip that is treated in the foregoing manner, as well as the control strip, that is only exposed in the same manner without being desensitized, are developed for a period of five minutes in a developed solution having the following composition:

TABLE 2

| Ingredient: | Amount, grams |
|---|---|
| p-Methylaminophenyl sulfate | 2 |
| Sodium sulfite, desiccated | 90 |
| Hydroquinone | 8 |
| Sodium carbonate, monohydrate | 52.5 |
| Potassium bromide | 5 |
| Water to make 1 l. | |

The film is then fixed in the solution described in Table 3 below, washed and dried.

TABLE 3

| Ingredient: | Amount |
|---|---|
| Sodium thiosulfate | g 240 |
| Sodium sulfite, desiccated | g 15 |
| Acetic acid, 28% | ml 48 |
| Boric acid crystals | g 7.5 |
| Potassium alum | g 15 |
| Water to make 1 l. | |

EXAMPLES 2–5

The optical densities of the control strip, which contains no desensitizer, and the various areas of the stirp that is treated in the manner described in Example 1, are measured. The relsuts are set forth in Table 4 below.

TABLE 4

| Example No. | Area of strip resensitized | Density readings | | | | | |
|---|---|---|---|---|---|---|---|
| 2 | Control | 2.34 | 2.01 | 1.22 | 0.44 | 0.17 | 0.10 0.08 |
| 3 | A | 2.01 | 1.41 | 0.68 | 0.28 | 0.09 | 0.06 |
| 4 | A′ | 2.09 | 1.92 | 1.28 | 0.40 | 0.15 | 0.07 |
| 5 | B | 1.88 | 1.11 | 0.36 | 0.16 | 0.10 | 0.08 |

Density readings taken on the treated strip on areas that had not been thermally resensitized and exposed indicate a density of 0.07. The result set forth in Table 4 above, vividly illustrate by comparison, that the pinacryptol green desensitizing agent protects the film from subsequent exposures. For example, higher densities result in the case of area A′ as compared with area A, the latter being desensitized after exposure. This means that Area A′ which is not desensitized after its exposure is still further exposed when area B is exposed so that the image developed in area A′ has higher densities than the image developed in area A. On the other hand, the control strip, which contained no desensitizing agent at all, developed even higher densities than any of those of the treated strip. The areas on the treated strip that are not thermally resensitized yielded density readings illustrating substantial insensitivity to light.

A photographic element such as described in Example 1 is advantageously resensitized in area A, exposed, desensitized, resensitized in area B, exposed, desensitized, resensitized in area C, exposed, desensitized, resensitized in area D, exposed, desensitized, resensitized in area E, exposed, desensitized, resensitized in area F, exposed, desensitized, etc., and then processed as described in Example 1. The results show that the desensitized exposed areas are substantially unchanged by subsequent exposures.

Likewise, test results show that the desensitizing agent does not act as a development accelerator or otherwise affect development. Thus, the desensitizer protects the film from subsequent exposures, but does not significantly reduce the developability of the latent images in the areas to which it is applied.

EXAMPLE 6

A silver halide emulsion film strip identical to that provided in Example 1 is desensitized, thermally resensitized and desensitized in the manner described in that example, except that the same desensitizer, i.e., 4-chlorobenzotriazole is employed for subsequent local desensitization as is employed for the initial, general desensitization. The resulting film strip is processed in the manner described in Example 1. A comparison of the areas that are locally desensitized and those that are not indicates that the 4-nitro-6-chlorobenzotriazole protects the film from subsequent exposure where applied and does not reduce the developability of the latent images in the areas to which it is applied.

EXAMPLES 7–20

A cellulose acetate film support is coated with fine grained silver chlorobromide emulsion in the manner described in Example 1. Next, the entire surface of the emulsion is coated with 1.0 gram of the desensitizer, 4-nitro-6-chlorobenzotriazole, per mole of silver halide and dried. Fourteen different one square inch areas of the emulsion are each: thermally resensitized; exposed in an intensity scale sensitometer to record a latent image, and desensitized in a sequential manner. The brass heating unit decribed in Example 1 is utilized for thermal resensitization, while a different desensitizing agent is employed for each area. The desenstizing agent and thermal resensitizing conditions for each of the areas are set forth below in Table 5.

TABLE 5

| Example No. | Desensitizer | Thermal resensitization conditions | |
|---|---|---|---|
| | | Time, sec. | Temp., °C. |
| 7 | 3,5-dinitrobenzhydrazide | 10 | 130 |
| 8 | 5-nitrobenzo-1,2,3-triazole | 20 | 110 |
| 9 | 2,3-dimethyl-6-nitrobenzothiazolium p-toluenesulfonate | 45 | 100 |
| 10 | 2-phenylbenzo-1,2,3-thiadiazolium bromide | 60 | 100 |
| 11 | N,N′-decamethylene-bis-(quinoxalinium)perchlorate | 120 | 120 |
| 12 | Methylene blue chloride | 10 | 170 |
| 13 | 1-methyl-2-(p-nitrostyryl)-6-ethoxyquinolinium p-toluenesulfonate | 20 | 180 |
| 14 | Pinakryptol green (chloride) | 45 | 120 |
| 15 | 2(p-diethylaminophenyliminomethyl)-1,6-dimethylquinolinium chloride | 60 | 110 |
| 16 | 2(p-diemthylaminophenyliminomethyl)-3-ethylbenzothiazolium ethosulfate | 120 | 100 |
| 17 | Phenosafranine (chloride) | 5 | 160 |
| 18 | 1,3-diamino-5-methylphenazinium chloride | 10 | 140 |
| 19 | 3-methyl-2-bis(phenylazo) methylene benzothiazoline | 20 | 150 |
| 20 | Anthraquinone-2-sulphotauride | 45 | 100 |

The desensitizer is applied locally with a felt pad after each exposure. The particular desensitizer is employed in perdetermined concentrations that result in the desensitized area of the emulsion having a sufficiently low sensitivity that even after the final resensitized area is exposed, recognizable differences in density between each resensitized area will result. Next, the photoelement is developed in a developer having the following composition:

TABLE 6

| Ingredient: | Amount, grams |
| --- | --- |
| N-methyl-p-aminophenol | 3.1 |
| Sodium sulfite, desiccated | 45.0 |
| Hydroquinone | 12.0 |
| Sodium carbonate, desiccated | 67.5 |
| Potassium bromide | 1.9 |
| Water to make 2.0 l. | |

The developed element is then fixed, washed and dried as before. Each of the fourteen treated areas produce recognizable differences in visible density, respectively. Thus, it is concluded that the thermally resensitized areas respond to the exposure of that particular area, but after being exposed and desensitized, each area does not build up more developable density.

EXAMPLE 21

The procedure of Examples 7–20 is repeated, except that an evaporated silver halide coating rather than a silver halide emulsion layer is coated on the cellulose acetate support. This is accomplished in the following manner: An evaporated film is prepared by employing a standard vacuum coater (Consolidation Vacuum Corp. Model LC–18B), the interior metal parts of which are silver coated or made from materials that will resist corrosion by halogen gases. The materials to be evaporated are placed in boats made of thin metal strips through which an electric current is passed, heating the boats and their contents. The substrate upon which the vaporized materials are to be condensed is placed in the dome-shaped holder of the vacuum coater at some distance above the boats. Three ¼-gram pellets of silver bromide are placed in a silver boat 15 x 120 x .24 mm., and ½ gram of potassium bromide crystals is placed in a tungsten boat of the same size. The boats are clamped in the vacuum coater to separate electrodes above the base plate. A sheet of the cellulose acetate film base is attached to the domed holder at a distance of about 20 inches from the boats. A remotely operated shutter (silver coated) is placed over the boats between the substrate and the boats, and a glass monitor slide is placed between the samples of the substrate and in the same pane. The vacuum chamber is closed and evacuated to a pressure of $5 \times 10^{-5}$ torr. A potential is applied across the electrodes holding the tungsten boat causing a current of 275 amperes to flow, heating the boat and melting the potassium bromide. When the potassium bromide is completely molten, the shutter is opened and the potassium bromide vapor is allowed to condense on the substrate for a time sufficient to form a film approximately 8 millicrons thick. The shutter is then closed and the molten potassium allowed to solidify. The silver boat is heated next by an electric current of 370 amperes, and when the silver bromide becomes molten, the shutter is opened and a film of silver bromide 206 millimicrons thick is allowed to form on the substrate over the potassium bromide film. The shutter is closed, the silver bromide melt covered, and air admitted to the vacuum chamber. The film thus obtained is overcoated with a 2% solution of gelatin containing 0.010 gram of formaldehyde per gram of gelatin. The solution is maintained at a temperature of 45° C. and the overcoated material is air dried at room temperature. The resulting photoelement is generally desensitized and then locally resensitized, exposed and desensitized as in Examples 7–20. Finally the element is developed, fixed and washed. As in the case of the preceding example, the resulting negative has recognizable differences in density between the various locally-treated areas. Thus, the method of the present invention is suitable for treatment of evaporated silver halide layers as well as a silver halide emulsion layer.

EXAMPLE 22

A generally desensitized photographic element is made as described in Example 1. One area of the element is resensitized with a heated brass block having a heating surface corresponding in area to the output plane area of a bundle of optical fibers. The resensitized area of the photographic element is positioned over the output plane of the bundle of optical fibers and exposed to a light image of one letter of the alphabet fed into the input plane of the bundle of optical fibers. After sufficient exposure to create a good latent image the resensitized and exposed area of the photographic element is desensitized by applying the solution of pinacryptol green described in Example 1. Then the sequence described is repeated to produce a latent image of a second letter of the alphabet in a second area of the element, and so on until finally the photographic element contains latent images of each letter in the alphabet in different areas of the element. The composite exposure is then developed, washed, fixed, washed and dried, leaving a composite mask image that is a negative of the input image. The positive mask is made from the negative mask by contact printing on a conventional photographic film and developed, fixed, washed and dried as described previously. The masks produced are used advantageously in fiber optic systems used for character recognition.

Similarly other photographic elements using other silver halide emulsions or evaporated silver halide and other desensitizing agents of our invention are used advantageously to prepare masks as described in Example 22 for character recognition systems.

The invention has been described in detail with particular reference to certain preferred embodiments thereof, but it will be understood that variations and modifications can be effected within the spirit and scope of the invention as described hereinabove and as defined in the appended claims.

We claim:
1. A process comprising the steps:
    (1) thermally resensitizing one area of a silver halide layer that has been rendered insensitive to the recording of latent images by a chemical densitizing agent,
    (2) exposing the said locally resensitized area of the silver halide layer with a light image to produce a latent image,
    (3) desensitizing the said locally resensitized area of said layer by application of a chemical desensitizing agent, and
    (4) photographically developing the said latent image to produce a corresponding visible image.
2. The process of claim 1 wherein said layer comprises a silver halide emulsion.
3. The process of claim 1 wherein the layer comprises an evaporated silver halide layer.
4. A process comprising the steps:
    (1) thermally resensitizing one area of a silver halide layer that has been rendered insensitive to the recording of latent images by a chemical desensitizing agent,
    (2) exposing the said locally resensitized area of the silver halide layer with a light image to produce a latent image,
    (3) desensitizing the said locally resensitized area of said layer by application of a chemical desensitizing agent,
    (4) thermally resensitizing a second area of the said silver halide layer,

(5) exposing said second resensitized area of said silver halide layer with a second light image to produce a second latent image, (6) desensitizing the said second resensitized area and (7) photographically developing the said latent images to produce corresponding visible images.

5. The process of claim 4 wherein the silver halide layer is rendered in sensitive to the recording of latent images by the incorporation therein of a desensitizing agent.

6. The process of claim 4 wherein the silver halide layer is rendered insensitive to the recording of latent images by applying a coating thereover of a desensitizing agent.

7. The process of claim 4 wherein the silver halide layer is rendered insensitive to the recording of latent images and the locally resensitized area of the layer is desensitized employing the same desensitizing agent.

8. The process of claim 4 wherein the silver halide layer is rendered insensitive to the recording of latent images and the locally resensitized area of the layer is desensitized employing a different desensitizing agent.

9. The process of claim 4 wherein the thermal resensitization is conducted at a temperature in the range of between about 100° and about 300° C. for a period of time in the range of from about 1 to about 300 seconds.

10. The process of claim 4 wherein the locally resensitized portion of the layer is desensitized by applying thereto a desensitizing agent selected from the group consisting of a mercury salt, a rhodium salt, an anthraquinone dye containing a sulfoalkylaminosulfone radical, a non-heterocyclic aromatic compound containing at least one nitro radical, and a heterocyclic compound containing at least one hetero atom selected from the group consisting of a sulfur atom and a nitrogen atom.

11. The process of claim 4 wherein the locally resensitized area of the silver halide layer is desensitized by applying thereto a desensitizing agent is selected from the group consisting of mercuric chloride, triammonium hexachlororhodite, 3,5-dinitrobenzhydrazide, 5-nitrobenzo-1,2,3-triazole, 4-nitro-6-chlorobenzotriazole, 2,3-dimethyl-6-nitrobenzothiazolium-p-toluenesulfonate, 2-phenyl-benzo-1,2,3-thiadiazolium bromide, N,N' - decamethylene-bis (quinoxalinium) perchlorate, methylene blue chloride, 1-methyl - 2 - (p - nitrostyryl) - 6 - ethoxyquinolinium - p- toluenesulfonate, 2-(p-diethylaminophenyliminomethyl)-1,6-dimethylquinolinium chloride, 2-(p-dimethylaminophenyliminomethyl)-3-ethylbenzothiazolium ethosulfate, phenosafranine chloride, Pinakryptol green chloride, 1,3-diamino-5-methylphenazinium chloride, 3-methyl-2-bis (phenylazo)methylene benzothiazoline, and anthraquinone-2-sulphotauride.

12. The process of claim 4 wherein the locally resensitized area of the silver halide layer is desensitized by applying thereto the desensitizing agent Pinacryptol green chloride.

13. The process of claim 4 wherein the locally resensitized area of the silver halide layer is desensitized by applying thereto the desensitizing agent is 4-nitro-6-chlorobenzotriazole.

14. A process for producing a mask containing a plurality of images for an optical fiber character recognition system comprising a plurality of light-conducting optical fibers, each having an input end and an output end, said process comprising the steps:

(1) thermally resensitizing one area of a silver halide layer that has been rendered insensitive to the recording of latent images by a chemical desensitizing agent, (2) exposing the said locally resensitized area of the silver halide layer with a first light image from the said output plane to produce a first latent image, said first light image corresponding to a light image from a first character at the said input plane;

(3) desensitizing the said locally resensitized area of said layer by application of a chemical desensitizing agent (4) thermally resensitizing a second area of the said silver halide layer, (5) exposing said second resensitized area of said silver halide layer with a second light image from the said output plane to produce a second latent image in the said second area, said second light image corresponding to a light image from a second character at the said input plane, (6) desensitizing the said second resensitized area by application of a chemical desensitizing agent, and (7) photographically developing the said latent images to produce visible images corresponding to the said light images of the characters at the said input plane.

15. A process comprising the steps:

(1) thermally resensitizing one area of a silver halide layer that has been rendered insensitive to the recording of latent images by applying thereto a desensitizing agent selected from the group consisting of a mercury salt, a rhodium salt, an anthraquinone dye containing a sulfoalkylaminosulfone radical, a non-heterocyclic aromatic compound containing at least one nitro radical, and a heterocyclic compound containing at least one hetero atom selected from the group consisting of a sulfur atom and a nitrogen atom, said resensitization being accomplished by heating the surface of the silver halide to a temperature in the range from about 100° C. to about 300° C. for a period of time in the range from about 1 to about 300 seconds, (2) exposing the said locally resensitized area of the silver halide layer with a light image to produce a latent image, (3) desensitizing the said locally resensitized area of said layer by applying thereto a desensitizing agent selected from the group consisting of a mercury salt, a rhodium salt, an anthraquinone dye containing a sulfoalkylaminosulfone radical, a nonheterocyclic aromatic compound containing at least one nitro radical, and a heterocyclic compound containing at least one hetero atom selected from the group consisting of a sulfur atom and a nitrogen atom, (4) repeating steps (1), (2) and (3) at least once to other areas of said silver halide layer, and (5) photographically developing the latent images produced thereby to corresponding visible images.

References Cited
UNITED STATES PATENTS 3,250,618    5/1966    Stewart et al. _____ 96—65

NORMAN G. TORCHIN, Primary Examiner

A. T. SURO PICO, Assistant Examiner

U.S. Cl. X.R.
96—41